United States Patent [19]
Toth

[11] Patent Number: 5,337,891
[45] Date of Patent: Aug. 16, 1994

[54] WATER AND DIRT PROTECTIVE, CAMCORDER, SHOOTING CASE

[76] Inventor: John B. Toth, 6012 Yarrow St. #B15, Arvada, Colo. 80004

[21] Appl. No.: 991,312

[22] Filed: Dec. 16, 1972

Related U.S. Application Data

[63] Continuation-in-part of Ser. No. 783,168, Jan. 14, 1992, abandoned.

[51] Int. Cl.$^5$ .............................................. B65D 85/38
[52] U.S. Cl. ................................................. 206/316.2
[58] Field of Search ............................ 206/316.1, 316.2

[56] References Cited

U.S. PATENT DOCUMENTS

| | | | |
|---|---|---|---|
| 4,176,701 | 12/1979 | Welgan | 206/316.2 |
| 4,260,004 | 4/1981 | Domke | 206/316.2 |
| 4,751,950 | 6/1988 | Bock | 206/316.2 |
| 4,923,060 | 5/1990 | Breslau | 206/316.2 |
| 4,927,017 | 5/1990 | Easter | 206/316.2 |
| 4,982,841 | 1/1991 | Goedecke | 206/316.2 |
| 4,984,662 | 1/1991 | Jacober | 206/316.2 |
| 5,092,458 | 3/1992 | Yokoyama | 206/316.2 |

FOREIGN PATENT DOCUMENTS

3245044 7/1984 Fed. Rep. of Germany ... 206/316.2

*Primary Examiner*—William I. Price
*Attorney, Agent, or Firm*—Ken Richardson

[57] ABSTRACT

A water and dirt protective, camcorder, shooting case comprises an enclosure. The enclosure comprises an outer structure that substantially encapsulates the camcorder and minimizes damage from adverse environmental elements and from harmful shock and impact from external objects, while allowing camcorder shooting with the enclosed camcorder. The enclosure includes interconnected folding end frames, tension members for allowing the enclosure to be adjustable from a collapsed, flexible, folded arrangement to an erect, tensioned and semi-rigid arrangement, which semi-rigid arrangement serves to minimize said damage. The enclosure also comprises a water and snow resistant, a dirt and dust protective, and a shock and impact protective material to effect minimizing said damage. Lastly, the enclosure has a mounting means interconnected with the end frames, tensioning members and outer structure so as to allow the enclosure to be suitable for use with a number of camcorder models having different formats, physical sizes and camcorder control positions.

20 Claims, 5 Drawing Sheets

WATER AND DIRT PROTECTIVE, CAMCORDER, SHOOTING CASE

This is a continuation-in-part of an application having Ser. No. 7/783,168, filed Jan. 14, 1992 and now abandoned.

BACKGROUND OF THE INVENTION

1. Field of Invention

This invention relates to camcorder bags, and more particularly, relates to an improved, water and dirt protective, camcorder, shooting case.

2. Description of the Prior Art

Camcorders are often used outdoors where the camcorder are susceptible to damage from harmful environmental elements and associated nuisances and hazards. For example, camcorders are frequently subject to a liquid drenching witch shooting in the rain or from a boat. Sometimes, for instance, camcorders are accidentally dropped in water while lounging at pools. Also, camcorders are often placed on tables along with food and drink, where liquids such as coffee, sugary soda pop, milk and other hazardous mallet like crumbs can easily fall in their cracks.

Camcorders drenched with salt water can result in corroded metal parts. Internal standing water can interfere with the operation of camcorders. Tape and film exposed to water and moisture can deteriorate from fungus, mold and mildew. Sticking or staining liquids can muck-up internal switch contacts or cause electrical shorts. The purchase of a replacement camcorder or acquiring repairs to remedy damage from water, snow mid other liquids can be expensive.

Additionally, the use of the camcorders in a dusty or sandy environment can be a major nuisance. To illustrate, accidentally dropping camcorders in sand or carrying camcorders on a long distance hike where dust permeates everywhere can subject the camcorders to premature failure and result in unwanted costly damage.

Another major nuisance is not limited to outdoor shooting and concerns damage resulting from dropped camcorders and from harmful impacts and shock caused by external objects. Camcorders accidentally dropped from bookshelves, tables, etc. can break, bend or chip off pieces of the external housing. Hard impacts can also bend, loosen, break or separate mechanical and electrical parts that are critical to the camcorder operation. Further, major repairs to correct damage from harmful impacts and shock can also be expensive.

Thus, there is a need to protect camcorders from harmful environmental elements and associated hazards and nuisances, particularly, during outdoor use and shooting. To cope with this need, prior art protective coverings in the form of shields have been fabricated to protect camcorders. Some shields virtually encapsulate the camcorder and include closeable signal receiving means. The receiving means opens the shield to allow the camcorder to receive an audio visual signal and closes the shield in a storage position. U.S. Pat. Ser. No. 4,927,017 is an example of a shield-type protective covering.

Another approach to protect camcorders is taught in U.S. Pat. Ser. No. 4,982,841, which provides a waterproof envelope that fits various camcorder housing shapes. The envelope provides a supporting device for the camcorder and allows adjustment of the camcorder autofocus lens.

A related problem the prior art has attempted to solve concerns designing camera cases for protection against impact and shock from foreign objects within and outside of camera cases. Some designs provide collapsible soft-walled cases having multiple compartments for storing camera accessories. Collapsible designs, for example, are taught in U.S. Pat. Ser. Nos. 4,984,662 and 4,260,004. Other designs provide hard or soft leather protective cases, or rigid plastic and almost non-destructible fiberglass cases.

Another prior art problem related to protecting video and photographic equipment from water damage concerns underwater photography. In Flip Schulke, *Underwater Photograph for Everyone*, Prince-Hall Inc., pp. 3 and 49 (1978), thirty-five millimeter, single lens reflex cameras are protected from water during underwater photography by a soft, vinyl, transparent housing that encloses the camera. The housing includes a diver's built-in glove for holding the camera within the enclosure and for working the camera's control.

Prior art camcorder cases, however, have suffered from one or more shortcomings. For example, some are flexible and unsturdy, such that, they do not satisfactorily minimize the undesirable effects of shock and impact from external objects and from dropping. Some do not provide dependable waterproof characteristics, and thus, do not maintain file camcorder completely safe and dry when shooting ill the rain. Some do not allow manipulation of camcorder controls while the camcorder is enclosed within its protective case, bag or shield. Some cases are specifically designed to be mated with specific camcorders and are not suitable for use with other different camcorder models, sizes or formats.

SUMMARY OF THE INVENTION

Against the foregoing background, it is therefore a general object of the present invention to provide all improved, lightweight, durable, water and snow protective, dirt and dust protective, shock and impact protective, camcorder, shooting case that overcomes many of the disadvantages of prior art camcorder cases.

It is another general object to provide a lightweight, durable, water and snow protective, dirt and dust protective, shock and impact protective, camcorder case for making camcorder shooting in an outdoor environmental practical.

It is still another general object to provide a lightweight, durable, water and snow protective, dirt and dust protective, shock and impact protective, camcorder, shooting case that is easy to carry and store.

It is a specific object to provide a lightweight, durable, water and snow protective, dirt and dust protective, and shock and impact protective, camcorder, shooting case that allows easy, smooth, accurate manipulation of camcorder controls when shooting in an outdoor environment with an enclosed camcorder.

It is another specific object to provide a lightweight, durable, easy to use, camcorder shooting case that allows shooting in an outdoor environment while substantially minimizing damage to an enclosed camcorder from adverse environmental elements, such as dirt, dust, water and snow, and from harmful shock and impact by external objects and dropping.

It is a more specific object to provide a lightweight, durable, water and snow protective, dirt and dust protective, and shock and impact protective, camcorder, shooting case that includes gloves for accessing an enclosed camcorder's controls, and for permitting easy and accurate manipulation of the controls to effect dependable shooting.

It is yet a specific object to provide a lightweight, durable, water and snow protective, dirt and dust protective, shock and impact protective, camcorder, shooting case that adjustably secures an enclosed camcorder to substantially minimize camcorder damage from jarring and moving of the enclosed camcorder.

It is still a specific object to provide a lightweight, durable, dirt and dust protective, water and snow protective camcorder shooting case that adjustably allows compatibility with a number of enclosed camcorders having different control positions, formats or sizes.

It is a further specific object to provide a lightweight, durable, water and snow protective, dirt and dust protective, and shock and impact protective, camcorder, shooting case that allows direct viewing through an enclosed camcorder's eyepiece during shooting in an outdoor environment.

It is yet a further specific object to provide a lightweight, durable, water and snow protective, shock and impact protective, dirt and dust protective, camcorder shooting case that provides a positive buoyancy to allow the case and enclosed camcorder to float to the surface when dropped in relatively deep water.

It is yet and still a further specific object to provide a collapsible, lightweight, durable, water and snow protective, dirt and dust protective, shock and impact protective, camcorder, shooting case that is compact, flexible and easy to pack when collapsed, and is semi-rigid, strong and durable when erected.

Additional objects, advantages and novel features of the invention will be set forth in part in the description which follows, and in part will become apparent to those skilled in the art upon examination of the following, or may be learned by practice of the invention. The object and advantage of the invention may be realized and attained by means of the instrumentation and combinations particularly pointed out in the appended claims.

To achieve the foregoing and other objects, the present invention in brief summary comprises a water and dirt protective, camcorder, shooting case. The case comprises an enclosure that substantially encapsulates the camcorder. The enclosing structure comprises an outer structure that minimizes damage from adverse environmental elements and from harmful shock and impact from external objects, while allowing shooting with the enclosed camcorder. The enclosure includes interconnected, folding, end frames and tension control members for allowing the enclosure to be adjustable from a collapsed, flexible, folded arrangement to an erect, tensioned and semi-rigid arrangement, which semi-rigid arrangement serves to minimize the damage. The outer structure comprises a water and snow resistant, a dirt and dust protective, and a shock and impact protective material to effect minimizing said damage. Lastly, the enclosure has a mounting means interconnected with the end frames, the tension control members and the outer structure so as to allow the outer structure to be suitable for use with the plurality of camcorder models having different formats, physical sizes and camcorder control positions.

BRIEF DESCRIPTION OF THE DRAWINGS

The accompanying drawings, which are incorporated in and form part of the specification, illustrate the preferred embodiment of the present invention, and together with the description serve to explain the principals of the invention. In the drawings.

DETAILED DESCRIPTION OF THE PREFERRED EMBODIMENT OF THE INVENTION

Referring initially to FIGS. 1-4, there is shown a water and dirt protective, camcorder shooting case of the present invention, generally indicated by the reference number 10. Camcorder shooting case 10 is constructed to provide a mix of stability and protection when used under adverse environmental elements and associated hazards and nuisances. It also provides convenience and ease in camcorder operations, as well as in handling and storage. For this purpose, camcorder shooting case 10 preferably is in the form of a hexagon-prism or barrel-shaped collapsible, tent-like enclosure. Although case 10 preferably includes a hexagonal shape, it may include other shapes, as will occur to those skilled in the art, such as rectangular or cylindrical prism, or box-type shapes, wedge shapes, cone shapes, and etc.

Figure 1:
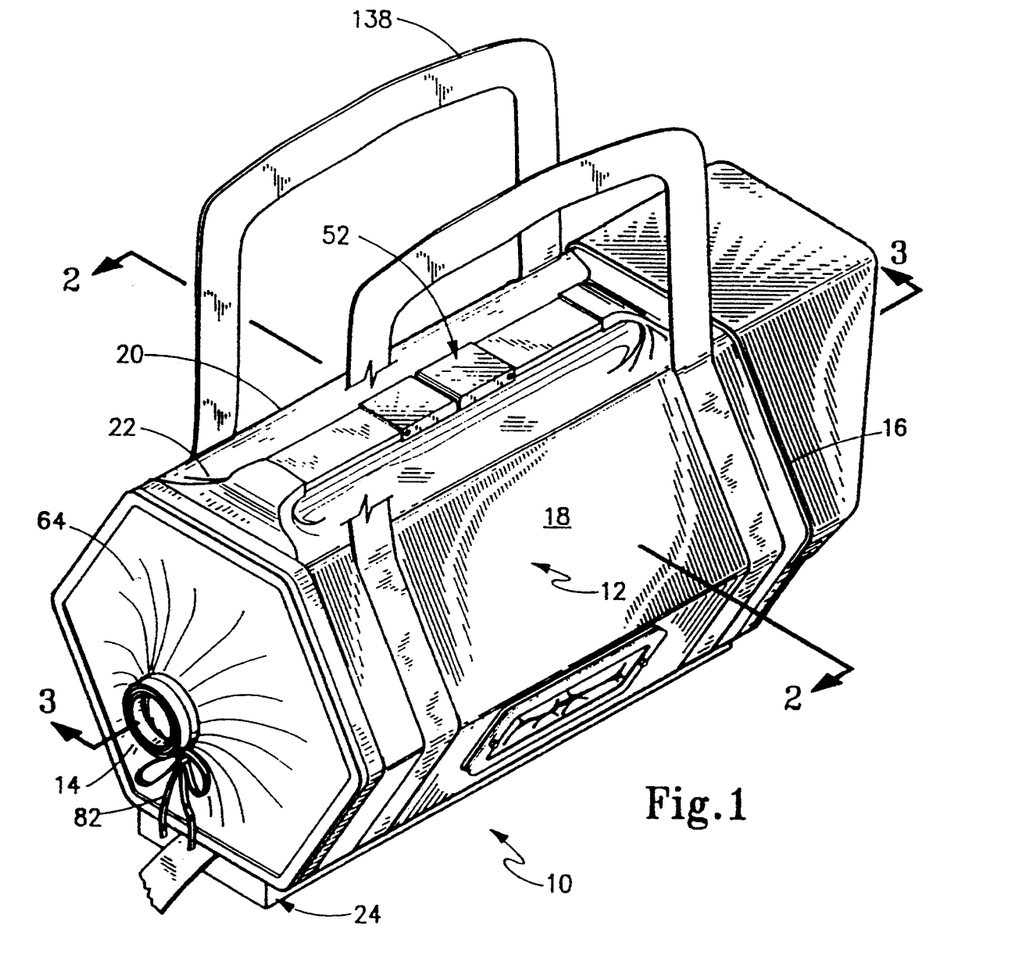
FIG. 1 is a partially broken away, perspective view of a water and dirt protective, camcorder, shooting case constructed in accordance with the invention.
Figures 4, 5:
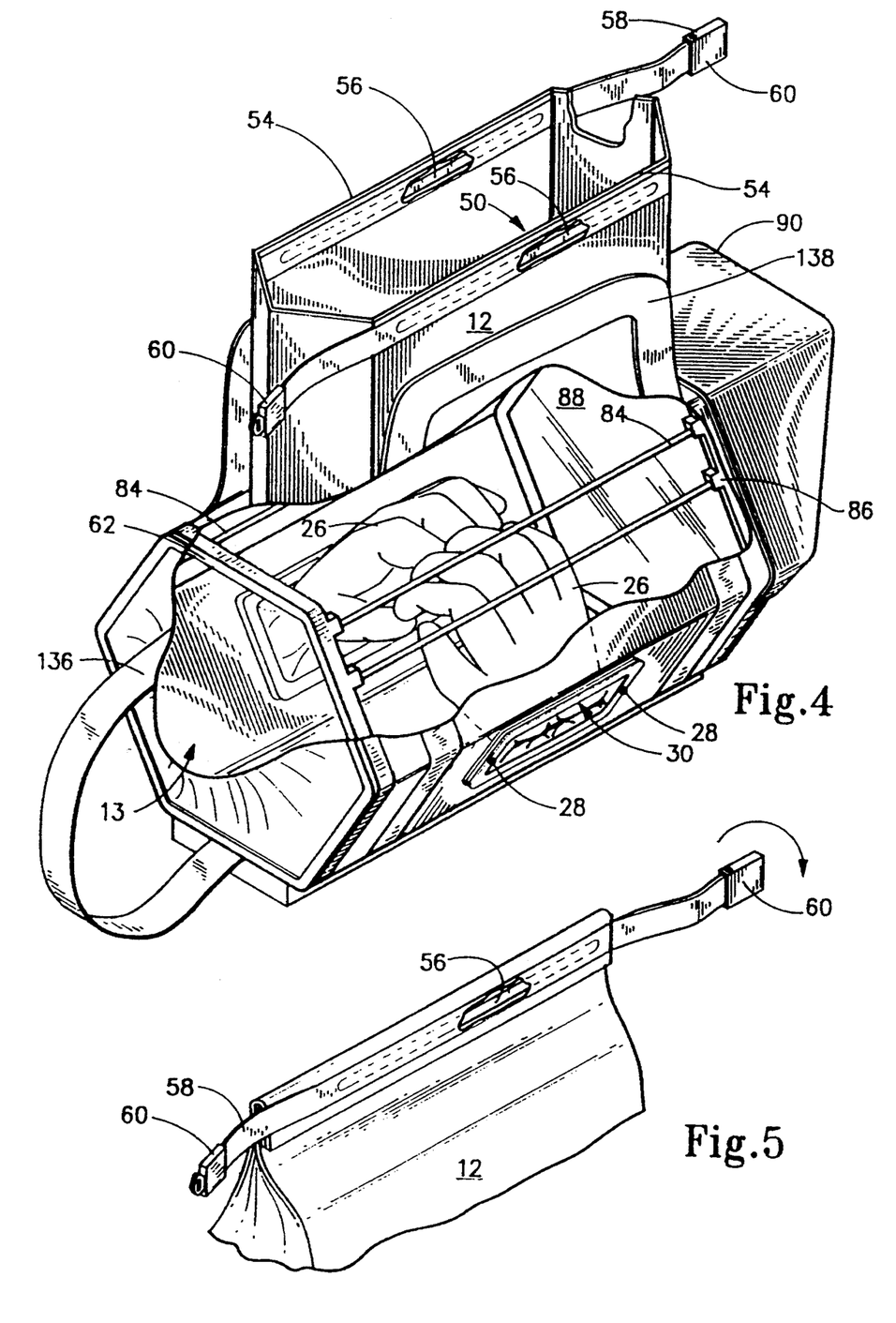
FIG. 4 is a partially broken away, perspective view of the water and dirt protective, camcorder, shooting case of FIG. 1 illustrating a top side of the case in an open position for receiving a camcorder therein.
FIG. 5 is a similar view to FIG. 4, illustrating the top side of the camcorder, shooting case initially being folded.

The hexagonal-shaped enclosure comprises an outer shell-like section or structure, generally depicted as reference numeral 12. Outer structure 12 defines a watertight compartment generally depicted by the reference numeral 13 for receiving a camcorder, as is best shown in FIGS. 1 and 4 and will become more apparent hereinafter. Outer structure 12 is fabricated from a lightweight, breathable, durable, resiliently flexible, water-resistant, puncture resistant, and dirt and dust resistant material. Further, it is contemplated that such outer, structural material be functional in all seasonal climate variations; retain shape and function when wet; and not unravel or fray. Suitable fabrics for this purpose are generally plastic materials such as awning dacron, Goretex, and Kevlar. A preferred material is ballistic nylon.

Figure 2:
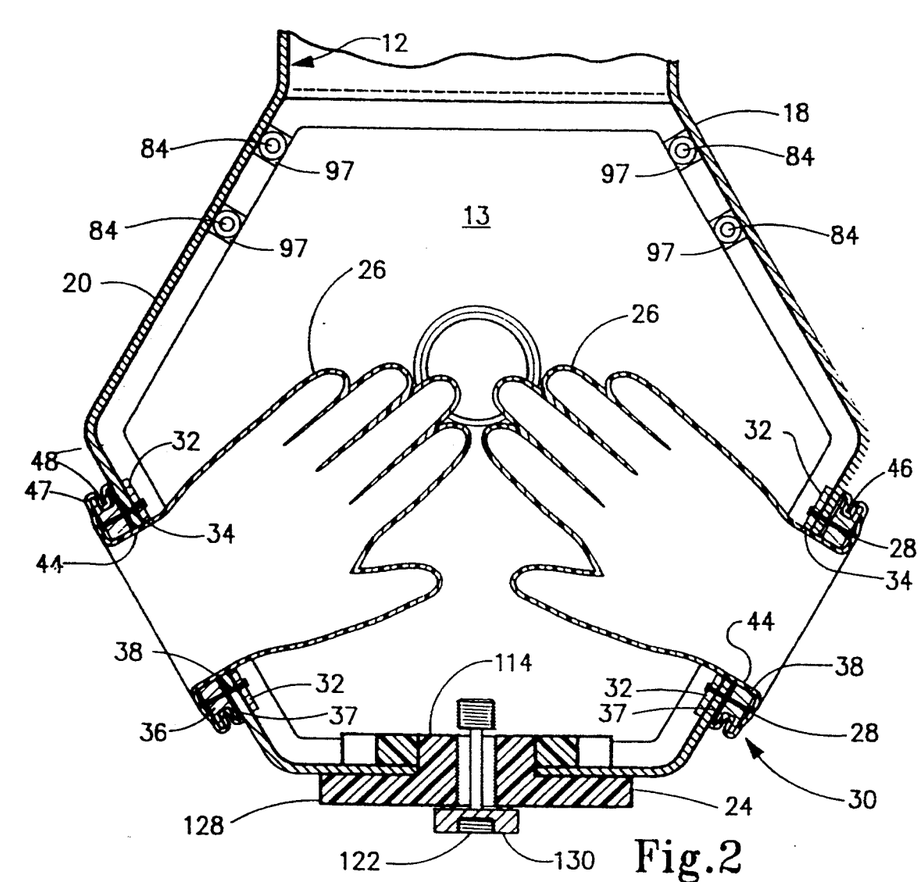
FIG. 2 is a partially broken away, cross-sectional, end view of the water and dirt protective camcorder shooting case of FIG. 1 taken along lines 2—2 of FIG. 1, illustrating gloves of the camcorder shooting case.

Enclosure 12 further comprises a pair of longitudinally spaced back and front sides 14, 16, respectively; a pair of laterally spaced end sides 18, 20; a top side 22; and a bottom side 24. Although the two sides 14, 16 are described herein as back and front sides, it will be appreciated that the construction and function of the two sides 14, 16 are substantially identical. As is best shown in FIGS. 2 and 4, each one of the two sides 18, 20 is provided with a glove 26, one glove for matching with the left hand, and the other glove for matching with the right hand.

Gloves 26 serve to receive the camcorder operator's hands therein and to allow sure handling of the enclosed camcorder. For example, gloves 26 allows the operator's finger to assess and manipulate various controls of the camcorder to effect dependable shooting while the camcorder is enclosed within case 10. In the present instance, gloves 26 are fabricated from a watertight, elastomeric material in a manner to allow freedom and dexterity in finger movement. Moreover, gloves 26 are sized to allow reaching and operating the controls of different enclosed camcorder models having different control formats. The different camcorder models are also expected to have controls that vary in location within enclosure 12 with respect to the configuration of the controls and the size and shape and of particular models.

Gloves 26 are preferably removably secured to sides 18, 20, so as to completely seal the enclosed camcorder from water and other environmental elements during outdoor shooting and to allow their replacement. Securing gloves 26 to sides 18, 20 is accomplished with conventional gaskets, bolts and nuts 28, and a pair of frame assemblies, generally depicted by the reference numeral 30, which are fastened to case 10 in a manner to form a watertight connection. It will be understood that since each one of the two frames assemblies 30 substantially comprise the same structure and function, a description of one will suffice for the other.

Frame assembly 30 comprises, firstly, an inner, generally oval-shaped, plastic ring 32 having an aperture 34 of a suitable size for receiving there through, glove 26, and, secondly, an outer, generally oval-shaped, plastic ring 36 having a similar aperture 38 for also receiving glove 26 there through. Inner and outer rings 32, 36 are fastened to opposed surfaces of lateral sides 18, 20 of enclosure 12, respectively, as is clearly shown in FIG. 2. Notice that outer ring 36 is provided with a matching oval-shaped, hollow gasket 37. It will also be noted that frame assembly 30 has a shape that generally conforms to the profile of enclosure 12 as defined by lateral sides 18, 20, bottom side 24 and end sides 12, 14.

By this connection, associated enclosure material 12 is sandwiched between opposed flat surfaces of inner frame ring 32 and gasket 37 and outer frame ring 36. Additionally, inner and outer ring apertures 34, 38 are aligned with a perforation 44 of enclosure 12 so as to allow glove 26 to pass through the two ring apertures 34, 38, hollow gasket 37, and enclosure perforation 44. As previously mentioned, the inner and outer rings 32, 36 are fastened to enclosure 12 in a watertight manner with a pair of spaced gasket, nut and bolt-type fasteners 28.

Also, in the connection of gloves 26 to frame assembly 30, outer frame ring 36 is provided with a U-shaped groove or channel 46, which runs around an outer, peripheral edge of ring 36 for mountably receiving thereon glove 26. A cuff 47 of glove 26 is circumferentially located within channel 46. Cuff 47 is removably bound within projecting lips defined by channel 46 by a glove draw string 48 connected to cuff 47, or other suitable fastening device, such as a compression band or retainer ring.

It is evident that gloves 26 are not limited to being connected to sides 18, 20 through frame assemblies 30 and bolt, nut and gasket fasteners 28, and may be joined to case 10 through various other watertight fastening systems, as will occur to those skilled in the art. For example, gloves 26 or frame assembly 30 may be permanently integrally molded to case 10. It is further evident that the aforesaid frame and glove connection allows case 10 to be adjustable for use with different size gloves and for replacement of gloves.

Figures 6, 7:
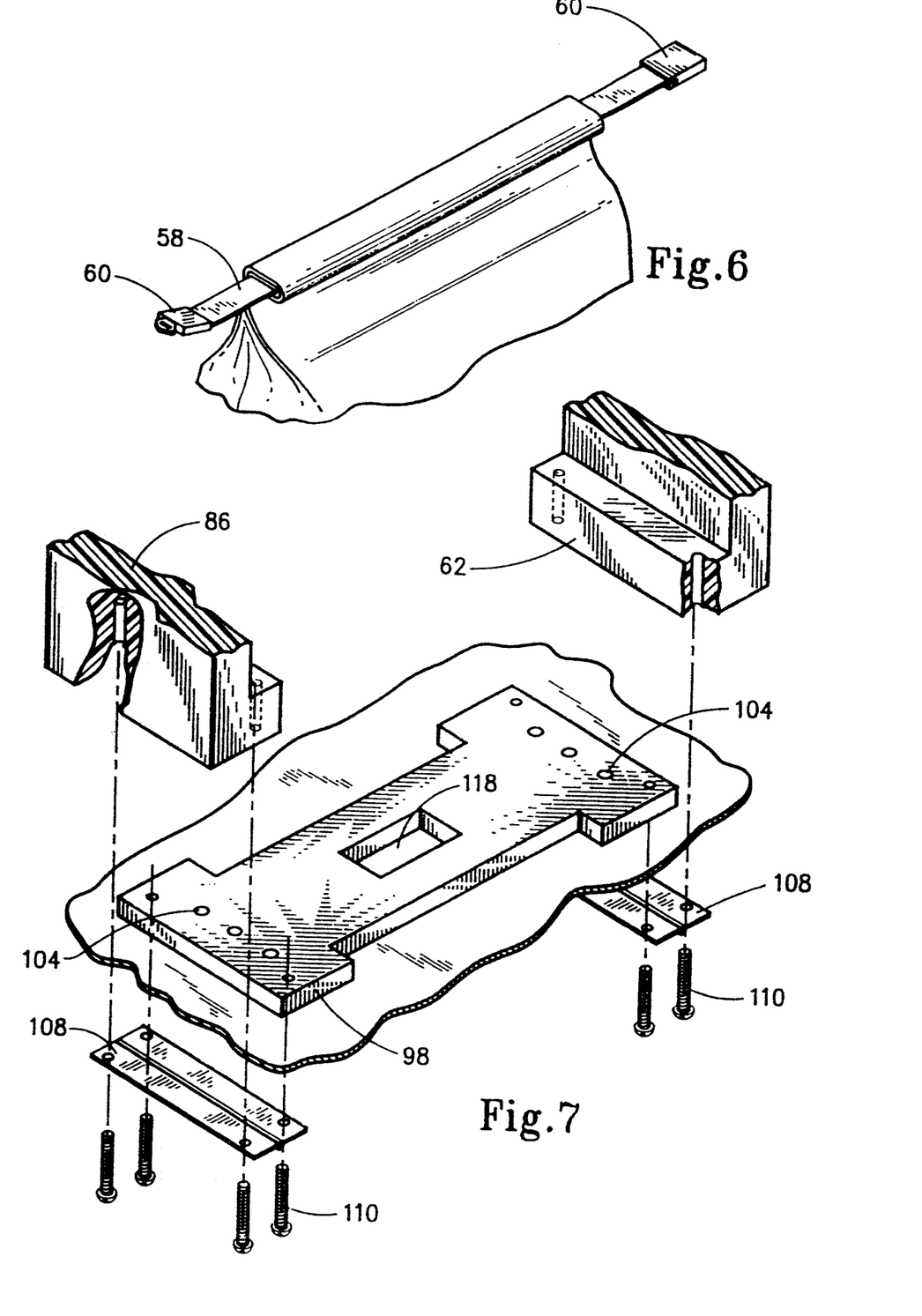
FIG. 6 is a similar view to FIG. 5, illustrating the top side of the camcorder shooting case being partially folded.
FIG. 7 is an enlarged, partially broken away, detailed, perspective view illustrating an inner bottom side of the camcorder shooting case.

Referring now to FIGS. 1 and 2 and particularly to FIGS. 5 and 6, outer enclosure structure 12 is formed to provide top side 22 with a closable opening, generally depicted by reference numeral 50 for receiving a camcorder through the top thereof. The illustrated opening 50 comprises a releasable, rolling-type fastener for providing enclosure 12, and thus, compartment 13, with a watertight locking arrangement generally deposited by reference numeral 52. In the present form of watertight arrangement 52, each one of the two, longitudinal, peripheral edges 54 of outer structure 12 includes an elongated relatively rigid strip 56 with respect to the enclosure material 12.

Strips 56 are preferably made of nylon and the enclosure edges 54 are rolled onto and over rigid strips 56 when the locking arrangement 52 is activated or operated. Additionally, the longitudinal outer top surface of enclosure material 12 is provided with a continuous, flexible material or strap 58. Moreover, strap 58 is integrally formed with enclosure material 12 and provides a fastener 60 at opening 50.

Fastener 60 in this instance comprises a spaced, mating clasp and catch. More specifically, the clasp and catch is in the form of a buckle-type fastener that is permanently attached to strap 58, such that, one or the other is located at each side 14, 16. As previously mentioned, locking arrangement 52 is activated when the two top peripheral edges 54 are pressed together, folded over and rolled on nylon strips 56 in a circular manner to effect closing opening 50.

Referring now to FIGS. 1, 5 and 6, as top edges 54 are lightly rolled on to themselves, strips 56 serve as a relatively stiff longitudinal axis, while the wrapped top of enclosure 12 forms sort of an elongated, cylindrical-shaped roll that substantially resist entry of water into enclosure 12. Opening 50 is sealed by doubling enclosure material 12 at lateral, end sides 14, 16, such that the doubled material converges and the clasp and catch of fastener 60 are united and locked. It will now be appreciated that locking arrangement 52, when unfastened and when reversibly rolled, is constructed to form an opening 50 of a suitable size to receive therein a number of different camcorders of various sizes, shapes and control formats.

Figure 3:
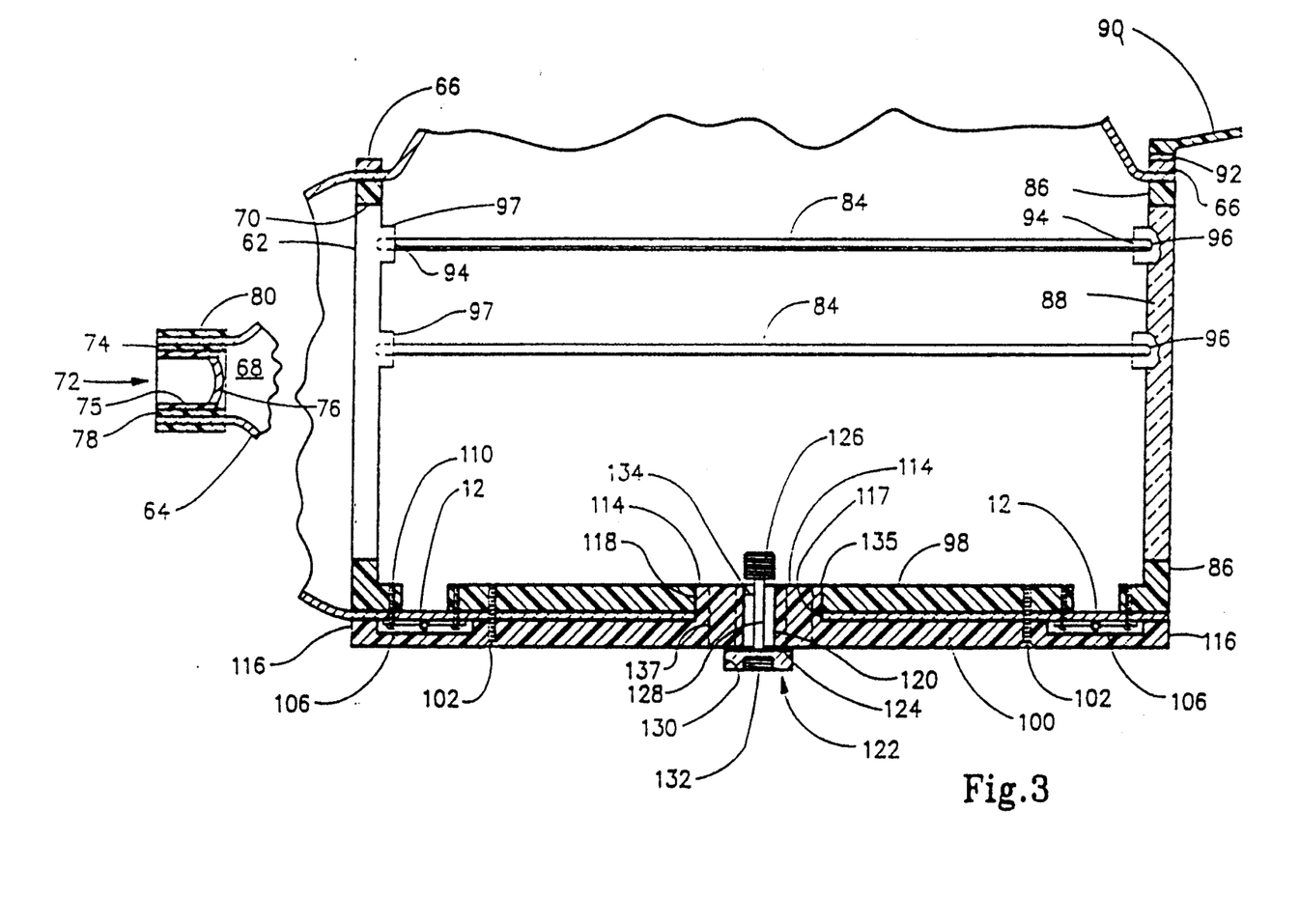
FIG. 3 is a partially broken away, cross-sectional, front view of the water and dirt protective, camcorder, shooting case of FIG. 1, taken along lines 3—3 of FIG. 1 illustrating a bottom portion of the case.
Figure 8:
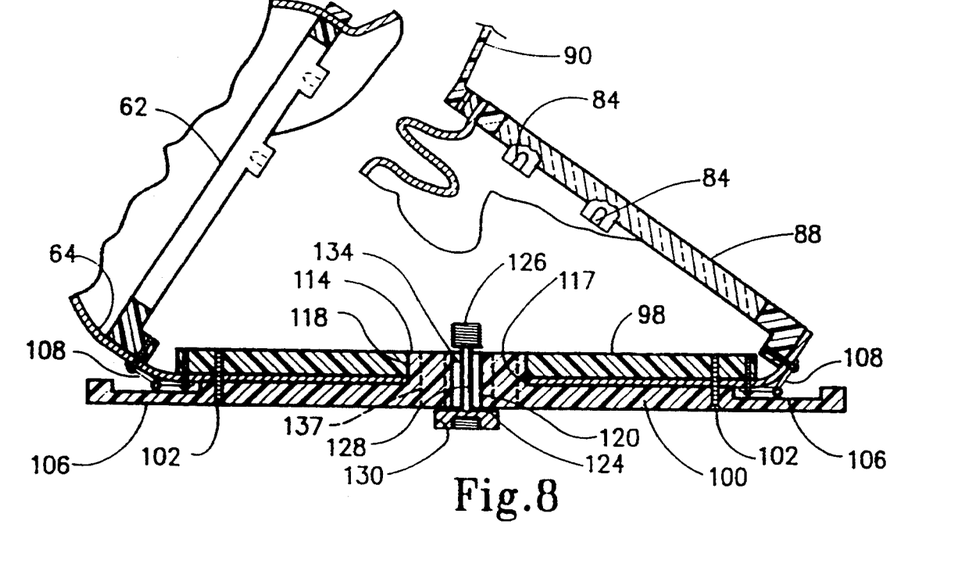
FIG. 8 is a similar view to FIG. 3, illustrating the camcorder shooting case in a folded arrangement.

As is best shown in FIGS. 1 and particularly FIGS. 3, 4 and 8, end side 14 comprises a hard, rigid, stiff, lightweight, frame member 62 with respect to the flexible material of outer structure 12. Frame 62 is preferably fabricated from plastic, and resists bending and deflection, when subjected to shock and impact from external objects and dropping. Further, frame 62 serves to protect an enclosed camcorder from shock and impact damage and to support and tension outer enclosure structure 12, as will be more fully explained herein below. Notably, it will be understood that the enclosed camcorder forms no pan of the present invention and has been omitted from the drawings for the sake of clarity, since camcorders are well known in the video arts.

In keeping with the invention, frame 62 further includes a sealable sheath means, generally depicted as reference numeral 64, for protecting and enclosing the eyepiece of the enclosed camcorder, while allowing physical engagement with the camcorder eyepiece and direct viewing therethrough. Sheath 64 is integrally formed with enclosure material 12, mid preferably, is made from a flexible, durable, elastic, lightweight, puncture resistant, water resistant, breathable material, such as nylon or dacron cloth. Sheath 64 preferably is generally in the form of a foldable, hollow, conical-shaped, tube or boot. Moreover, sheath 64 generally projects externally from frame 62 in a longitudinal direction and is positively joined to frame 62 in a watertight connection by a retainer ring, clamping band or spline-type coupling. Preferably, a plastic clamping band 66 is employed to retain sheath 64, frame 62.

It will now be apparent that the tubular shape of sheath 64 defines a cavity 68. Cavity 68 is of suitable size for adjustably receiving therein the eyepiece and associated viewfinder of the enclosed camcorder. To allow receiving the camcorder eyepiece within sheath cavity 68, frame 62 is provided with an aperture 70 that communicates with sheath cavity 68. It will also be apparent that the creased, tubular construction of sheath 64 enables articulation of sheath 64 with respect to frame 62. This articulation allows adjustable lateral and vertical movement of sheath 64 to permit alignment with camcorder's eyepiece and viewfinder reposed therein. In this regard, cavity 68 and frame aperture 62 are sized to provide tolerance for inserting therein the eyepiece and associated viewfinder of various camcorder models of different sizes and configurations of fire camcorder controls.

It is a feature of sheath 64 that direct viewing through the camcorder eyepiece and sealing the camcorder eyepiece from adverse environmental elements is accomplished by a terminal end opening 72 of sheath 64. To permit direct viewing, terminal end 72 includes a removable window generally denoted as reference numeral 74. Window 74 is positioned to physically abut or engage the camcorder eyepiece through appropriate manual articulation of folded sheath 64 and comprises a soft, flexible, plastic lens 76, a threaded lens frame 75, inner plastic pressure ring 78 and an outer high strength, plastic clamping ring 80.

Lens 76 is attached to lens frame 75, preferably by bonding, while lens frame 75 is threadably attached to an inner plastic pressure ring 78. Inner ting 78 is positioned within terminal sheath end 72 so as to engage an inner surface of sheath 64. So positioned, inner ring 78 supports outer, high strength, plastic clamping ring 80. Clamping ring 80 engages an outer surface of sheath 64, while beating on inner ting 78. This arrangement effects a coupling between terminal end portion 72, sheath 64 and rings 78, 80 that is sufficiently snug to be watertight. The coupling allows lens 76 and frame 75 to be threadly removed from terminal end portion 72. It will be apparent to skilled artisans that case 10 is not limited to the described connection of window 74 at sheath 64. Another preferred construction, for instance, provides a clamping ring with a circumferentially extending slot that matingly receives terminal end 72 within spaced outer and inner finger portions of the slot. The clamping ring 80 could be permanently joined to terminal end 72 by compression or bonding. Also, lens 76 could be permanently bonded, instead of threaded, to the clamping ring.

It will also be appreciated that the sheath 64 is provided with a high-strength cord or tie member 82 adjacent outer clamping ting 80, as is best illustrated in FIG. 1. Tie member 82 is of a suitable length to permit regions of slack and non-tensioned sheath material close to ring 80 to be compressed and tied with a knot around the eye piece of the camcorder located within enclosure 12. When cord 82 is tied to clutch the camcorder eyepiece, a desired positional relationship is maintained between the terminal sheath end 72 and the eyepiece of the enclosed camcorder.

Pursuant to the invention, frame 62 is also provided with at least one pair of elongated, tubular-shaped, rigid, tension, control members 84. Tension control members 84 can be fabricated from a various rigid materials, such as metal, wood or plastic and preferably comprises fiberglass. Tension control members 84 provide enclosure 12 with a tensioned, substantially taut, slack and sag-free shape, as will also be more fully explained hereinafter.

Upon inspection of FIGS. 1, 2, 3 and 8 it is evident that end side 16 also includes an end frame 86. Moreover, it will be seen that the frame 86 comprises substantially the same structure as end frame 62. A difference between the frames 62 and 86 is that frame 86 includes a transparent means 88 for allowing camcorder shooting, instead of a sheath and frame aperture 64, 70, respectively. Another difference between frames 62 and 86 is that frame 86 is provided with a removable, weather shield or hood 90 for covering and protecting window 88 from rain and other adverse weather conditions during shooting with the enclosed camcorder. Hood 90 comprises an elastomeric of foam material that is impervious to water, such as rubber. Also, hood 90 is removably bound to outer structure 12 in a manner to project outward therefrom with a snap or velcro-type fastener arrangement 92.

Referring again to transparent means 88, it preferably comprises an optically clear window. Window 88, in the illustrated form of FIG. 3 is permanently integrally joined to frame 86 and outer structure 12 in a manner to resist water from entering or leaking into case 10. Window 88 is also positioned and physically sized at frame 86 so that the enclosed camcorder lens can be adjustably positioned to conveniently shoot therethrough. Incidentally, it will be understood that window 88 is not limited to being joined permanently to frame 86. Window 88 may be hinged to frame 86 and outer structure 12 to swing open and shut, or may be joined in other arrangements, as will occur to skilled artisans.

Having observed the details of frames 62, 86, attention may now be given to the pair of tension control members 84. In the present form, two pairs of control members 84 are suspended or bridged between frames 62, 86 so as to extend longitudinally in two separate imaginary horizontal planes therebetween. By this bridge arrangement, control members 84 effect tensioning the outer enclosure structure 12 and maintaining frames 62, 86 in a generally vertical perpendicular position. Moreover, opposed terminal ends 94 of each control member 84 are removably disconnectably seated in a snug interference fit within mating recesses 96, which are formed with enhanced or raised boss portions 98. Notably, the fit is sufficiently light to retain control members 84 within recesses 96 unless manually removed.

It will now be appreciated that control members 84 when filled within mating recesses 96 for case 10 enclosure 12 is heavily braced by the extended and sealed tension control members 84 so as to protect case 10 from impact from external objects. Last, it will be appreciated that case 10 may be used for camcorder shooting or protection, while tension control members 84 are seated in mating recesses 96.

Turning once again to FIG. 3, and particularly to FIG. 7, it is a feature of the invention that bottom side 24 include a first, rigid, generally I-shaped, inner bottom portion 98, and a second, rigid, generally bar-shaped, outer bottom portion 100. The first and second bottom portions 97, 100 are preferably formed from plastic mid serve to support and lock the camcorder within enclosure 12, while also protecting the enclosed camcorder from harmful impacts and shock, as will be more fully explained herein below.

By the arrangement of bottom portions 98, 100, the material of enclosure 12 is wrapped around the enclosure bottom, such that, it is interposed between confronting inner surfaces of first and second bottom sides 98, 100. Additionally, the first and second bottom sides 98, 100 are connected to one another through two, spaced rows of conventional screws 102 inserted at opposed ends of second bottom side 100, and mating tapped apertures 104 of bottom 98. Notably, this sandwich-type construction assist in providing case 10 with a watertight enclosure 12 for housing the camcorder, as will also be more apparent hereinafter.

It is evident that the structure and arrangement of bottom portion 98, 100 may be different without departing from the present protective camcorder shooting case invention. For example, bottom side 98 may be provided with an upper, resilient, flexible layer juxtaposed thereon for absorbing impact and shock caused by external objects to minimize damage to the enclosed camcorder mounted thereon through bottom side 98. For this construction, bottom side 98 will be in the form of a composite, with an upper cushion-type portion and a lower rigid portion.

Another feature of bottom side 100 is a pair of spaced slots 106 positioned at opposed longitudinally spaced ends of side 102, which are aligned to receive a pair of conventional, flexible joints in the form of hinges 108, one hinge 108 for each slot. Hinges 108 are pivotally connected between end frames 62 and 86 and inner bottom portion 98. Moreover, each one of the pair of hinges 108 are also connected to a corresponding one of the two end frames 62, 86, through a screw and tapped, aperture-type, fastening arrangement 110. Notably, the screws are inserted through the bottom sides of hinges 108, such that, the enclosure material 12 is sandwiched between end frames 62, 86, couplings 99 and hinges 108. From inspection of FIG. 8, it will be further noted that hinges 108 permit frames 62, 86 to pivot and be folded inwardly towards one another. The positional relationship between abutting engagement bottom side portion 100 and end flames 62, 86 also serve to brace end frames 62, 86, prevent flames 62, 86 from falling outward, and to increase stability of frames 62, 86, when they are in a vertical upright position.

Attention is now given to an upright, block-shaped pad member 114, which is integrally formed with bottom portion 100, as is best illustrated in FIG. 3. Pad 114 is positioned approximately midway between longitudinally spaced sides 116 of outer bottom side 100. Pad 114 is formed with respect to inner bottom portion 98 and enclosure structure 12 so as to be received in a passage 117 of enclosure material 12 and a slot 118 of inner bottom portion 98, as is best shown in FIGS. 2 and 3, 7, and to allow the camcorder to be removably connected to pad 114.

Detachably mounting the camcorder within enclosure 12 at pad 114 is accomplished by providing bottom side 100 with an internally threaded aperture 120 for removably receiving a mating, camcorder coupling screw, generally depicted as reference numeral 122, and gasket 124. The coupling screw serves to connect a camcorder to the enclosure in a watertight connection. In a particularly preferred embodiment, camcorder coupling screw 122 includes a top, externally, threaded portion 126, an intermediate, non-threaded, or shank potion 128 and a knurled screwhead portion 130.

The top threaded portion 126 of camcorder coupling screw 122 is sized to enable camcorder coupling screw 122, with a matting gasket 124, to be manually twisted to effect releasably fastening the enclosed camcorder to case 10 in the watertight connection. Further, shank portion 128 is sized to provide a shank tolerance in the fit of coupling screw at threaded aperture 120. Thus, it is obvious that the connection of the enclosed camcorder to case 10 will also be provided with a tolerance. Tolerance 134 allows movement of shank 128 within threaded aperture 120 and permits deviation in aligning the enclosed camcorder for attachment to camcorder coupling screw 122, as well as permitting a substantially tight connection between the enclosed camcorder and pad 114. Camcorder screw head 130 is provided with recessed internal threads 132 that are sized to removably receive conventional camcorder screws from conventional tripods. Finally, upon inspection of FIG. 2, it will be noted that coupling screw 122 upon insertion through-pad 114 is retained in enclosure 12 by top threaded portion 126 when the camcorder is not attachably mounted or inside of compartment 13.

It will now be appreciated that the area defined by pad 114 is sufficiently large to allow a plurality of pre-sized apertures 137 to be prepositioned therein. Prepositioning and presizing allows enclosure 12 to be compatible for receiving a number of camcorders of different formats and sizes. For instance, compatibility with different camcorders is accomplished by disposing a plurality of threaded aperture at particular predetermined locations or regions of pad 114 to best position a specific camcorder fore, at and size. In this arrangement, the threaded apertures not being employed to mount a particular camcorder will be sealed or closed with removable watertight threaded plugs not herein shown. It will now be further appreciated that when the enclosed camcorder is fastened to the camcorder coupling screw 122, case 10 maintains its watertight integrity. Additionally, coupling screw 122 also allows the enclosed camcorder to be mounted on conventional tripods to effect shooting therefrom.

Referring again to FIGS. 1 and 4, case 10 in accordance with the invention, is provided with a shoulder strap 136 for carrying the enclosed camcorder while leaving the hands free, and with a handle 138 for manually carrying case 10 like a briefcase and for setting it down. The strap and handle 136, 138 are securely attached to enclosure 12, preferably by sewing, in a manner to maintain its water-tight integrity.

It will now be apparent in the practice of the invention that enclosure 12 is adjustable from a collapsed, flexible, folded arrangement to an erect and substantially tensioned, taunt, semi-rigid arrangement. The folded, flexible arrangement allows case 10 to be easily packed and carried along on trips, while advantageously taking up less space then most rigid camcorder cases. The tensioned, semi-rigid arrangement allows the inserted and mounted camcorder to be completely enclosed. The enclosing structure 12 protects the mounted camcorder from damage resulting from adverse environmental elements and associated nuisances and hazards and from harmful impact and shock caused by external objects.

In the present instance, case 10 is folded by first removing the camcorder, and thereafter, removing tension control members 84. Tension control members 84 are removed by pulling the end frames 62, 86 slightly outward so as to relieve a clamping pressure exerted on tension control 84 members by two frames 62, 86. Release of the clamping pressure permits the corresponding rod ends 94 to be manually removed from the associated frame recesses 96. Control members 84 are positioned at the bottom of enclosure 12, and thereafter, frames 62 and 86 are collapsed inwardly from vertical positions to horizontal positions adjacent associated portions of inner bottom side 98. Further, it will be evident upon inspection of FIG. 6, that sides 18, 20 are also caused to collapse in an inward direction when case 10 is folded.

It will be further appreciated that in the tensioned, semi-rigid arrangement, the two bottom portions 98, 100, frames 62, 86, tensioning control members 84 and hinges 108 are interconnected so as to cooperate and assist one another to tension the outer flexible structure 12. Such tensioning provides a substantially taut, slack and sag-free construction that enhances the capability of case 10 to absorb and minimize camcorder damage from harmful impacts mid shock.

Moreover, the aforesaid construction of case 10, when in the semi-rigid, tensioned arrangement, and when fastened at top case opening 50, provides a positive buoyancy with a camcorder enclosed therein. The positive buoyancy advantageously allows case 10 to float to a surface of water for a reasonable time in which to have an opportunity to retrieve the enclosed camcorder when it is accidentally dropped into relatively deep water. Finally, it is contemplated that enclosure 12 may be provided with at least one watertight viewing port or window, not herein illustrated, to allow visual inspection of the enclosed camcorder.

The foregoing description of a preferred embodiment of the water and dirt protective, camcorder, shooting case has been presented for purposes of illustration and description. It is not intended to be exhaustive or to limit the camcorder shooting case to the precise form described. Such presentation is to best explain the principles of the camcorder shooting case and its practical application to thereby enable others skilled in the art to best utilize the camcorder shooting case in various embodiments and with various modifications as are suited to the particular application contemplated. It is intended that the scope of the camcorder shooting case be defined by the claims appended hereto.

I claim:

1. A case for receiving a camcorder and for allowing outdoor shooting while substantially minimizing damage from adverse environmental elements comprising:
   a. an enclosure, the enclosure comprising an outer structure for substantially encapsulating the camcorder to effect minimizing damage from adverse environmental elements and from harmful shock and impact from external objects; said outer structure comprising a water and snow resistant, a dirt and dust protective, and a shock and impact protective material to said effect the minimization of damage; said enclosure allowing camcorder shooting with the camcorder reposed within said enclosure;
   b. said enclosure including interconnected folding end frames and tension members for allowing said enclosures to be adjustable from a collapsed, flexible, folded arrangement to an erect and substantially tensioned, semi-rigid arrangement to effect minimizing an enclosed camcorder from said damage;
   c. said enclosure having a mounting means interconnected with said end frames, tension members and outer structure so as to allow said outer structure to be suitable for use with a plurality of different camcorders having different physical sizes, formats and positioning of camcorder controls.

2. The invention of claim 1, wherein said case further comprises a sealable top portion for receiving said camcorder within said enclosure; said mounting means comprising a bottom portion for supporting the enclosed camcorder, said bottom portion comprising a coupling means for removably securing the enclosed camcorder in a watertight connection to said bottom portion; said bottom portion being suitable for retaining at least two coupling means in different regions thereof, said bottom portion having an ability to retain at least two different coupling means assisting the enclosure to be adjustably compatible with respect to releasably securing and aligning different camcorder models within said enclosure to permit camcorder shooting.

3. The invention of claim 2, wherein said case further comprises a pair of laterally spaced sides; each one of the pair of laterally spaced sides comprising watertight recess means for allowing manipulation of the controls of said enclosed camcorder.

4. The invention of claim 3, wherein each said recess means is integrally formed with one different side of said pair of lateral sides, each said recess means allowing the operator of the enclosed camcorder to manipulate of the camcorder controls, while maintaining said enclosed camcorder substantially free from water, snow, dust and dirt.

5. The invention of claim 4, wherein said case further comprises a pair of longitudinally spaced sides; a first longitudinal side including a sealable sheath means for allowing direct viewing through an eyepiece of the enclosed camcorder; and a second longitudinal side including a transparent means for allowing camcorder shooting therethrough.

6. The invention of claim 5, wherein said case provides a positive buoyancy when in a sealed and semi-rigid arrangement with said camcorder enclosed therein, said positive buoyancy allowing said case and enclosed camcorder therein to float to a surface of water, when said case is sealed and in a semi-rigid arrangement with said coupling means fastened thereto, and when said case with said enclosed camcorder therein is dropped into relatively deep water.

7. The invention of claim 4, wherein said bottom portion further comprises a first side portion pivotally connected to one side of said pair of longitudinally spaced sides, and a second side portion pivotally connected to a remaining side of said two pair of longitudinally spaced sides; said first side portion of said bottom portion and said second side portion of said bottom portion supporting said pair of longitudinally spaced sides in vertical positions when said enclosure is in said erect, semi-rigid arrangement and allowing said pair of longitudinally spaced sides to collapse when said enclosure is adjusted to the folded arrangement.

8. The invention of claim 7, wherein said bottom portion further comprises an aperture positioned therein at a predetermined position for receiving said coupling means; said coupling means allowing a particular camcorder of said plurality of different camcorder models to be releasably secured within said enclosure to prevent movement thereof; and said coupling means allowing selected camcorders of said plurality of different camcorder models to be adjustably aligned within said enclosure to effect camcorder shooting.

9. The invention of claim 8, wherein said aperture is threaded and provides a watertight joint when threadably mated with said coupling means; said coupling means having upper threads and lower threads, and an intermediate threadless portion that bridges said upper threads and said lower threads; said upper threads allowing said camcorder to be fastened to said case in said watertight connection and to releasably secure said enclosed camcorder, said lower threads allowing a camcorder screw of a camcorder tripod to be releasably secured thereto; said threadless portion providing a tolerance for said coupling means when inserted within said threaded aperture so as to assist in aligning said coupling means for fastening compatibility with said plurality of different camcorder models.

10. The invention of claim 1, wherein said outer structure further includes laterally spaced first and second sides; vertically spaced top and bottom sides; and longitudinally spaced first and second sides; each one of said first and second longitudinally spaced sides being foldable inwardly from a vertical position to a horizontal position adjacent the bottom side; each one of said first and second longitudinally spaced sides collapsing inwardly from a vertical position to a horizontal position when said first and second longitudinally spread sides are said folded.

11. The invention of claim 10, wherein said outer structure further comprises a resiliently flexible, foldable, water resistant, dirt and dust resistant, puncture resistant material, and said enclosure comprises a collapsed, flexible, compact arrangement with respect to said erect semi-rigid arrangement when folded as recited in claim 10.

12. The invention of claim 11, wherein said enclosure further comprises a pair of tension control members; said control members extending longitudinally between said pair of first and second longitudinally spaced sides; said control members tensioning said laterally spaced first and second sides, said vertically spaced top and bottom sides, and said longitudinally spaced first and second sides of said enclosure; said tension control members maintaining said first and second longitudinally spaced sides in a vertical position.

13. The invention of claim 12, wherein each one of said two longitudinally extending first and second sides include corresponding rigid, stiff, hollow first and second frame members; said first and second frame members resisting bending and deflection when subjected to shock and impact from external objects, said first and second frame members being integrally formed with said outer structure; said first and second frame members assisting said tension control members and said bottom side to enable said enclosure to form said tensioned, semi-rigid arrangement; and said bottom side being connected to said first and second frame members so as to permit said first and second frame members to said fold inwardly.

14. The invention of claim 13, wherein said pair of control members are removably connected between said first and second frame members; each one of said tension control members being received in mating recesses defined by said first and second frame members to which each one of said control members connect; said first and second frame members being foldable to the horizontal position when said tension control members are removed from within said mating recesses.

15. The invention of claim 14, wherein one of said two longitudinally spaced first and second sides includes a sheath means; the sheath means allowing direct viewing from an eyepiece of said enclosed camcorder; said sheath means being integrally formed in a watertight manner with the one of said two longitudinally spaced first and second sides formed integrally therewith; said sheath means projecting externally from said one of said two longitudinally spaced first and second sides formed integrally therewith; and wherein a remaining one of said two longitudinally spaced first and second sides includes a transparent means for allowing shooting therethrough with said enclosed camcorder, said transparent means comprising a window integrally connected in a watertight manner to a corresponding one of said first and second flames members; said window being protected from the weather by a hood member removably connected to said one of said remaining spaced first and second sides that said includes said transparent means.

16. The invention of claim 15, wherein said bottom side defines at least two segments; said at least two segments being connected to one another; and one segment of said at least two segments being pivotally connected to said first and second frame members so as to permit said first mid second longitudinal spaced sides with said corresponding frame members thereof to said fold inwardly.

17. The invention of claim 16, wherein said sheath means defines a cavity for adjustably receiving said eyepiece of said enclosed camcorder and for allowing said direct viewing with said eyepiece; said one or said first and second frame members being joined to said sheath means and further including an aperture for communicating with said sheath cavity; said aperture for communicating with said sheath cavity allowing a viewfinder and eyepiece of said camcorder to pass therethrough and be positioned in said sheath cavity; said sheath means further including a removable sheath window for physically engaging said eyepiece of said camcorder and for said allowing direct viewing through said eyepiece wire said sheath window; said sheath window further including a flexible, tie-type, fastening means to clutch said eyepiece of said enclosed camcorder and to maintain a desired positional relationship between said sheath window and said camcorder eyepiece.

18. The invention of claim 17, wherein the top side of said enclosure provides a closable opening for receiving said camcorder within said case; said closable opening comprising a releasable rolling fastener, said fastener being water-tight when fastened; said closable opening being rolled down to fasten said enclosure and reversibly rolled up to open said enclosure.

19. The invention of claim 18, wherein said outer structure is tensioned by said longitudinally spaced first and second sides; said laterally spaced first and second sides; said tension control members and said bottom side; the tensioning by said outer structure maintaining said enclosure structure substantially taut and free of slack and sag, when said enclosure is in said erect, semi-rigid arrangement; and wherein said erect, taut and tensioned case minimizes camcorder damage caused by impact and shock from external objects.

20. The invention of claim 19, wherein each one of said first and second laterally spaced sides comprises a removable glove to allow operation of said camcorder controls; said gloves being connected in a water-tight manner with said laterally spaced first and second sides; and wherein said enclosure further includes a shoulder strap and a carrying strap attached integrally therewith.

* * * * *